United States Patent [19]
Kranz

[11] Patent Number: 5,249,353
[45] Date of Patent: Oct. 5, 1993

[54] METHOD FOR PRODUCING A SEALING PROFILE

[75] Inventor: Jürgen Kranz, Lindau/Bodensee, Fed. Rep. of Germany

[73] Assignee: Metzeler Automotive Profiles GmbH, Lindau/Bodensee, Fed. Rep. of Germany

[21] Appl. No.: 751,160

[22] Filed: Aug. 28, 1991

[30] Foreign Application Priority Data

Aug. 28, 1990 [DE] Fed. Rep. of Germany ....... 4027191

[51] Int. Cl.$^5$ .............................................. E06B 7/16
[52] U.S. Cl. .................................... 29/446; 29/469.5; 29/527.1; 264/177.20; 428/122; 428/358
[58] Field of Search ................... 428/122, 358; 29/446, 29/469.5, 527.1; 264/177.20

[56] References Cited

U.S. PATENT DOCUMENTS

| 4,114,320 | 9/1978 | Pullan | 428/122 X |
| 4,381,273 | 4/1983 | Azzola | 428/122 X |
| 4,830,898 | 5/1989 | Smith | 428/122 |
| 5,009,947 | 4/1991 | McManus et al. | 428/122 |

Primary Examiner—Henry F. Epstein
Attorney, Agent, or Firm—Herbert L. Lerner; Laurence A. Greenberg

[57] ABSTRACT

A method for producing a sealing profile, such as for a motor vehicle, includes integrally extruding a profile with longitudinal regions, a clamping region of a compact elastomer, a U-shaped slit metal insert, and a sealing region of sponge rubber. The longitudinal regions are prestretched causing permanent stretching of the metal insert prior to bending the profile around narrow radii without creasing. The sealing profile includes a clamping region of a compact elastomer, a U-shaped slit metal insert, and a sealing region of sponge rubber coextruded integrally with the clamping region. The metal insert may be permanently prestretched in segments.

3 Claims, 1 Drawing Sheet

METHOD FOR PRODUCING A SEALING PROFILE

FIELD OF THE INVENTION

The invention relates to a method for producing a sealing profile or profiled gasket, particularly for motor vehicles, which is produced from a compact material and a cellular, adequately elastic material, and is bent about narrow radii without creasing, as well as a sealing profile produced according to the method.

DESCRIPTION OF THE RELATED ART

There is a danger in sealing profiles made from two profile regions of different materials, in particular with one region of sponge rubber, that the softer region in the radii will crease, thus reducing the sealing effect when the profiles are bent around narrow radii. Such profiles typically include a main profile of compact PVC, substantially in the form of a clamping and holding region, and an adhesively bonded sponge rubber profile region, which performs the actual sealing function. In order to avoid such creasing in that case, it is normal to stretch the sponge rubber region somewhat before the adhesive bonding, and to join it to the PVC profile region with the initial stress, thus greatly reducing the danger of creasing.

However, such a method for producing that kind of sealing profile is very complicated and entails a number of unknown factors, in particular in terms of attempting uniform initial stress of the sponge rubber region, which moreover result in an initial stress that impairs the sealing action of the sponge rubber in smooth regions of the course of the profile as well, where such initial stress is not intrinsically necessary.

SUMMARY OF THE INVENTION

It is accordingly an object of the invention to provide a method for producing a sealing profile and a sealing profile produced by the method, which overcome the hereinafore-mentioned disadvantages of the heretofore-known methods and devices of this general type, which can produce profiles very much more simply, and in which creasing that might possibly occur upon bending is reliably and purposefully avoided, in only the critical regions.

With the foregoing and other objects in view there is provided, in accordance with the invention, a method for producing a sealing profile or profiled gasket, especially for motor vehicles, which comprises integrally extruding a profile with longitudinal regions, a clamping region of a compact elastomer material, a U-shaped slit metal insert or inlay, and a sealing region of cellular, adequately elastic, sponge rubber material; and prestretching the corresponding or applicable longitudinal regions causing permanent stretching of the metal insert prior to bending the profile around narrow radii without creasing or folding.

In accordance with another mode of the invention, there is provided a method which comprises suitably stretching the metal insert sufficiently so that the extruded-on sponge rubber region undergoes prestressing in the axial direction.

With the method of the invention it is accordingly possible on one hand to obtain a profile of a more uniform elastic material, which can be coextruded in a single operation. Moreover, as a result of stretching the metal insert or the main strand of the profile, the sponge rubber region is prestressed in those regions in which creasing can occur, while in the smooth segments of the profile the sponge rubber is maintained in its natural consistency and can thus develop the full sealing action.

In accordance with a further mode of the invention, there is provided a method which comprises forming alternating lateral notches and central slits in the metal insert.

With the objects of the invention in view, there is also provided a sealing profile, comprising a clamping region of a compact elastomer, a U-shaped slit metal insert, a sealing region of sponge rubber coextruded integrally with the clamping region, and means for permitting the metal insert to be permanently prestretched in segments and preferably for permitting the profile to be bent around radii without creasing.

In accordance with another feature of the invention, the metal insert includes a flat strip of sheet metal having lateral notches facing one another and extending over approximately one-third of the strip width, and approximately central, transversely extending slits in the longitudinal direction between each pair of notches having a width of approximately one-third that of the sheet metal strip.

In accordance with a concomitant feature of the invention, the central slits are slightly offset laterally from one another in alternation.

Other features which are considered as characteristic for the invention are set forth in the appended claims.

Although the invention is illustrated and described herein as embodied in a method for producing a sealing profile and a sealing profile produced by the method, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
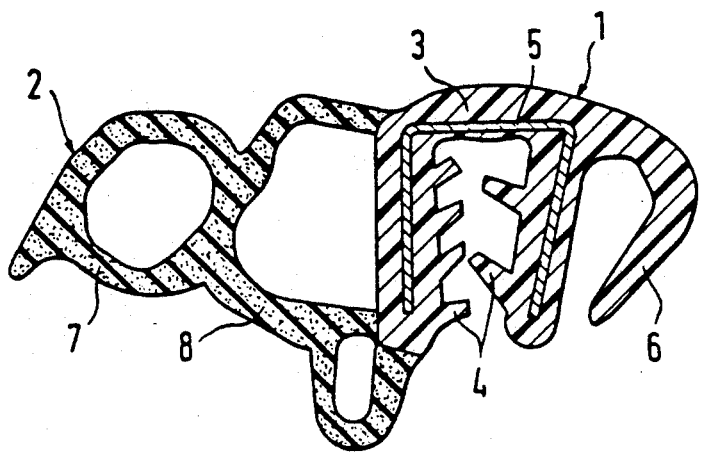
FIG. 1 is diagrammatic, cross-sectional view of a corresponding sealing profile with profiled regions of different material.

Referring now to the figures of the drawing in detail and first, particularly, to FIG. 1 thereof, there is seen a sealing profile or profiled gasket including a clamping region 1 formed of a compact elastomer and a softer sealing region 2 formed of sponge rubber. The clamping region 1 has a U-shaped profiled segment 3 with clamping lips 4 on the inside, and a correspondingly U-shaped bent metal insert or inlay 5, which will be described in further detail below. A sealing lip 6, which is likewise formed of compact rubber, may be vulcanized laterally onto the U-shaped profiled region 3.

In the illustrated exemplary embodiment, the sealing region 2 includes a tubular sealing segment 7 located on the outside and a sealing segment 8 located on the inside, initially in the shape of a U, which is laterally extruded onto one leg of the U-shaped profiled segment 3.

Figure 2:
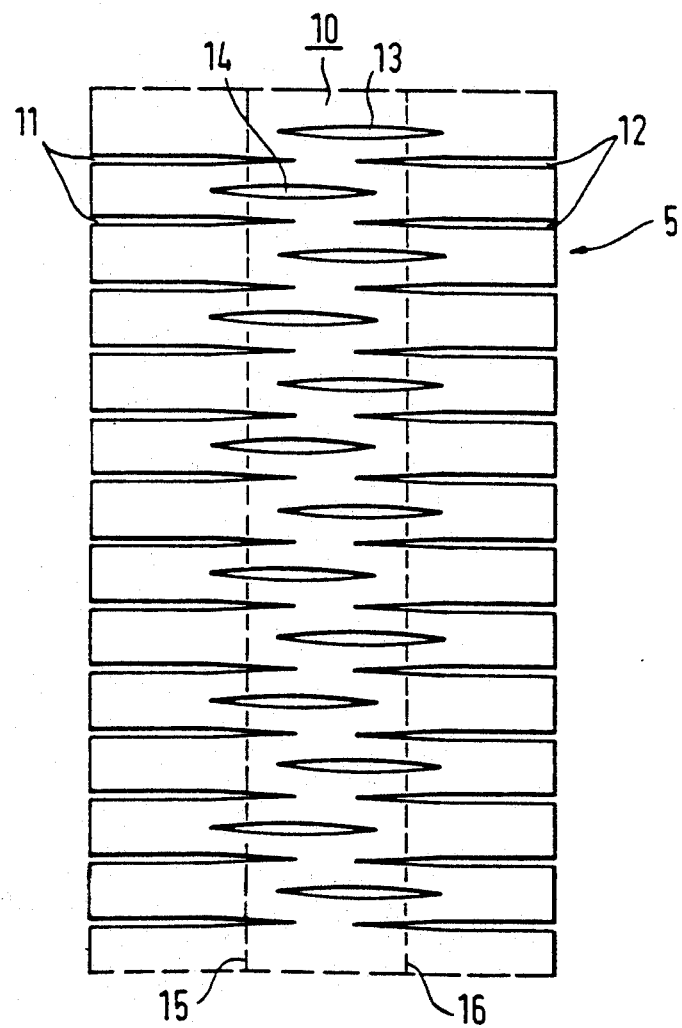
FIG. 2 is a plan view of a plane, as-yet unfolded metal insert, with appropriate notches and slits.

The metal insert 5 of the sealing profile is shown in detail, in a still-smooth state, in the plan view in FIG. 2. A smooth strip 10 of sheet metal which is provided for this purpose, has lateral notches 11 and 12 each facing one another in pairs. In the illustrated exemplary embodiment, each of the lateral notches extend over somewhat more than one-third of the width of the sheet-metal strip 10. Slits 13 and 14 are additionally cut into the strip 10 transversely of its longitudinal extension, between individual pairs of notches 11 and 12, as seen in the longitudinal direction of the sheet-metal strip 10. Each one of the slits 13 and 14 also extend over approximately one-third of the width of the sheet-metal strip 10. The notches 11, 12 and the slits 13, 14 provide means for permitting the metal insert to be prestretched in segments.

As can be seen from the illustrated exemplary embodiment, the slits 13 and 14 are slightly laterally offset from one another in alternation.

As can be seen from the drawing, the metal insert 5 is already slightly prestretched, elongated or distended during manufacture, in other words in the cutting of the slits, resulting in the gaps as shown, so that upon extrusion the rubber can pass through the gaps thus creating a better bond.

This sheet-metal strip 10 is then bent in a U along the broken lines 15 and 16, and then forms the metal insert 5 in the U-shaped profiled segment 3 of the sealing profile.

The sealing profile shown in FIG. 1 can thus be coextruded in one piece as a unit, and is in the form of a smooth profile.

However, when this kind of sealing profile is used in motor vehicle manufacture, it must often be passed around edges having very narrow radii. In order to avoid upsetting and thus creasing of the lateral sealing region 2 in these narrow radial regions, the profiled region 1 or metal insert 5 is stretched over the length of this kind of radial region, prior to bending of the sealing profile, so that the metal insert 5 is stretched even further and the notches 11, 12 and slits 13, 14 are spread even farther apart than what is shown in FIG. 2. As a result of this permanent lengthening of the metal insert 5 and thus of the profiled section 3, the sponge rubber of the sealing region 2 likewise undergoes a suitable permanent prestressing in those regions in which the sealing profile will later extend along the narrow radii. When the sealing profile is then correspondingly bent, the prestressing exerted upon the sponge rubber has the effect of causing the sponge rubber of the sealing region 2 to no longer be in creases or folds when bent, since the prestressing in the sponge rubber is precisely undone or only slightly exceeded, as a result of the shortening of the region of the sealing segment 2 located above or below.

The result is accordingly a sealing profile having material regions of different hardness, which can also be bent or pulled around very narrow radii as a result of the internal stretchable metal insert, without creating creases or folds in the softer region of the sponge rubber.

It should also be pointed out that the cross section shown in FIG. 1 represents only one possible shaping of such a sealing profile. It is understood that other configurations are also possible, as long as they make use of the basic principle of the invention.

I claim:

1. A method for producing a sealing profile, which comprises:
    integrally coextruding a profile with a clamping region of a compact elastomer having a U-shaped slit metal insert and a sealing region of sponge rubber;
    defining longitudinal regions on said profile to be bent around small radii;
    prestretching the defined longitudinal regions in an axial direction prior to bending, causing permanent stretching of the metal insert only for the bent regions and prestressing the sealing region of the sponge rubber; and
    subsequently bending the prestretched longitudinal regions around the small radii without creasing.

2. The method according to claim 1, which comprises forming alternating lateral notches and central slits in the metal insert.

3. A method for producing a sealing profile for motor vehicles, which comprises integrally coextruding a profile with longitudinal regions on a clamping region of a compact elastomer, a U-shaped slit metal insert, and a sealing region of sponge rubber; defining bending regions of the longitudinal regions to be bent around narrow radii; prestretching the bending regions in an axial direction causing permanent stretching of the metal insert only at the bending regions and prestressing the sealing region of sponge rubber prior to bending the profile around the radii; and subsequently bending the prestretched bending regions around the radii without creasing.

* * * * *